United States Patent Office 3,781,248
Patented Dec. 25, 1973

3,781,248
METHOD OF PRODUCING ACRYLIC COPOLYMER
Hiroshi Sakai, Ehime-ken, Satoshi Hamada, Matsuyama, Yoshio Yamanaka, Ehime-ken, Isao Ito, Matsuyama, and Zenji Izumi, Hideji Kitagawa, Eiji Mukoyama, Zennosuke Suzuki, Tadashi Kato, and Shuntaro Hosaka, Ehime-ken, Japan, assignors to Toray Industries, Inc., Chuo-ku, Tokyo, Japan
Filed Aug. 12, 1971, Ser. No. 171,185
Claims priority, application Japan, Aug. 13, 1970, 45/70,436
Int. Cl. C08f 3/76, 15/22
U.S. Cl. 260—793 M     5 Claims

ABSTRACT OF THE DISCLOSURE

A monomer mixture consisting essentially of acrylonitrile, a polymerizable vinyl monomer more hydrophobic than acrylonitrile and a polymerizable vinyl monomer more hydrophilic than acrylonitrile is polymerized in a reaction medium consisting of dimethyl sulfoxide and water. A relatively homogeneous acrylic copolymer dispersion is obtained within a relatively short period of time at a high conversion ratio.

BACKGROUND OF THE INVENTION

(1) Field of the invention

This invention is concerned with a novel method of producing a polymer containing acrylonitrile in a state of emulsion from a monomer mixture consisting mainly of acrylonitrile and a polymerizable vinyl monomer which is more hydrophobic than acrylonitrile in a reaction medium consisting essentially of 60–85% by weight of dimethyl sulfoxide and 40–15% by weight of water.

(2) Description of the prior art

Heretofore, various processes were suggested for producing copolymer containing acrylonitrile. One such process consisted of carrying out emulsion polymerization in an aqueous medium in the presence of an emulsifier. Another process consisted of carrying out the polymerization in a solvent in which the polymers of the acrylonitrile series are soluble.

In the former process the polymer is salted out and filtered to separate it from the reaction mixture and then dissolved in a solvent. The polymer is then passed through washing, granulation and drying steps to prepare a spinning solution. This process is unsatisfactory because of labor and time required for separation, washing, drying and dissolution. When copolymerization is conducted in two phases comprised of acrylonitrile and a hydrophobic monomer phase, or three phases comprised of acrylonitrile phase, a hydrophobic monomer phase, and a hydrophilic monomer phase, the differences in hydrophilic properties of the respective monomers causes the variations in the composition distribution of the polymers in the resulting composition to be substantial, and the processability and physical properties of the polymeric products generally tends to be poor.

In contrast thereto, in the solvent process the polymerization proceeds uniformly in the solvent. There is less variation in the composition distribution of the polymer in the polymeric resulting solution. The polymer may be converted directly into a spinning solution without separation of the polymer.

In British Pat. 928,114 a process is disclosed for preparing an acrylonitrile/vinylidene chloride copolymer in a solvent for a polymer such as dimethyl sulfoxide. However, this process is uneconomical because the polymerization rate is so slow that it takes an excessively long time to carry out the polymerization and it is necessary to make the polymerization temperature relatively high. It is difficult to process the polymerization product until polymerization ratio is quite high. In addition, the resulting polymer is highly discolored because the polymerization reaction is carried out at a high temperature for a long time.

Another process has been suggested in Japanese patent publication No. 10,996/1961 for continuously polymerizing a monomer mixture containing at least 80% by weight of acrylonitrile in a mixed medium of dimethyl sulfoxide and water. However, in this process, when the batch polymerization method is employed, the resulting polymer slurry tends to gel at a relatively low concentration of the polymer and cannot be stirred. It is accordingly essential to carry out the polymerization continuously in this process. However, when the polymerization is carried out continuously according to this process, the concentration of the polymer in the polymer slurry is at most 32% by weight and the polymerization ratio (conversion ratio) is at most 60% which is quite low. Because of the cost required for the recovery and purification of the unreacted monomers, and because the polymerization can only be conducted continuously this process is very inconvenient to employ when relatively small amounts of a given polymer composition are to be produced.

It is accordingly an object of this invention to overcome the aforementioned problems and disadvantages of the prior art processes.

An additional object of the present invention is to obtain an acrylic copolymer emulsion having a high conversion ratio.

Another object of the present invention is to obtain an acrylic copolymer which is excellent in physical properties and degree of whiteness.

Other objects and advantages of the present invention will become further apparent from a continued reading of the following description.

SUMMARY OF THE INVENTION

It has been found that when a polymerizable monomer mixture consisting essentially of acrylonitrile, a vinyl monomer more hydrophobic than acrylonitrile and a hydrophilic vinyl monomer is polymerized in a reaction medium consisting essentially of dimethyl sulfoxide and water at a ratio of 60:40 to 85:15 an emulsion of an acrylic copolymer is obtained having high concentration of copolymers without gelling. The copolymers are obtained within a short period of time and at high conversion ratio.

DETAILED DESCRIPTION

Figure 1:
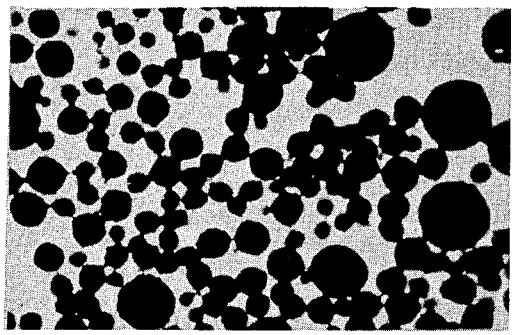
FIG. 1 is a photomicrograph showing the polymer obtained by the method of this invention in the dispersed state.

These objects of the present invention have been achieved by providing a method of producing an acrylic copolymer which comprises polymerizing a monomer mixture consisting essentially of (1) 80–19.7% by weight of acrylonitrile, (2) 19.7–80% by weight of a vinyl monomer more hydrophobic than acrylonitrile, and (3) at most 10% by weight of a vinyl monomer which is highly hydrophilic in a mixed reaction medium in which the ratio of dimethyl sulfoxide to water is 60:40–85:15 by weight.

It is important that the dimethyl sulfoxide-water reaction medium used in the process of the present invention have a dimethyl sulfoxide-water ratio of 60:40–85:15 by weight, preferably 65:35–80:20 by weight. When the amount of water in the dimethyl sulfoxide-water reaction medium is less than 15% by weight, even if the polymerization reaction proceeds, a satisfactory emulsion is not produced. The resulting reaction becomes essentially a solution polymerization process. The polymerization rate is slow and the polymerization ratio is likewise low. On the other hand, when the amount of water exceeds 40% by weight, the monomers do not sufficiently dissolve in the reaction medium and a hard granular polymer, which is unsuitable for further processing, is produced. The polymer separates out in the granular state from the polymer emulsion as the reaction proceeds. The ratio of dimethyl sulfoxide to water in the reaction medium i.e. 60/40–85/15 by weight, is for the reasons noted above one of the essential features of the method of the present invention.

The reaction medium in addition to containing dimethyl sulfoxide and water may also contain at most 10% by weight of the total mixture of a substance which has mutual solubility in dimethyl sulfoxide and water, such as alcohols, ketones, dimethyl formamide, dimethyl acetamide, α-butyrolactone, and ethylene carbonate.

It is important that the amount of acrylonitrile in the reaction medium of the present invention should be 80–19.7% by weight and more preferably 65–30% by weight based on the total amount of the monomer mixture. When the content of acrylonitrile exceeds 80% by weight, the content of the hydrophobic vinyl monomer is reduced to an amount at which the reaction mixture solidifies as the polymerization reaction proceeds and becomes impossible to stir.

The content of the hydrophobic polymerizable vinyl monomer in the monomer mixture should be 19.7–80% by weight of the monomer mixture. The hydrophobic vinyl monomer is a monomer whose solubility in water is less than that of acrylonitrile. Typical examples of such monomers are styrene, vinyl acetate, acrylic acid ester such as methyl acrylate and butyl acrylate, methacrylic acid ester such as methyl methacrylate and butyl methacrylate, vinyl ester, vinyl chloride, vinylidene chloride and methacrylonitrile. There are, however, many other suitable hydrophobic vinyl monomers which can be used in the method of this invention as will be obvious to those skilled in the art from a continued reading of the specification.

As the content of the hydrophobic polymerizable vinyl monomer is increased, a lower viscosity emulsion is obtained, despite the fact that the concentration of the polymer in the polymer emulsion is very high. In addition, the stability of the emulsion is increased. Because of this effect, the relative content of the hydrophobic polymerizable vinyl monomer is an important factor in the method of this present invention. When the ratio of the hydrophobic vinyl monomer is less than 19.7% by weight, the polymerization will proceed until the concentration of the polymer reaches a certain concentration and then the reaction mixture will gel and cannot thereafter be stirred. On the other hand, when the ratio of the hydrophobic monomer exceeds 80% by weight, although the viscosity of the polymer emulsion is low, a hard granular polymer tends to be produced in the emulsion.

An amount of 0.3–10% by weight of a hydrophilic vinyl monomer is also added to the monomer mixture used in the method of this invention. When a monomer mixture consisting of only acrylonitrile and a hydrophobic vinyl monomer is polymerized, as the reaction proceeds, the reaction system separates into two phases. The addition of the hydrophilic vinyl monomer prevents such separation and uniform polymeric emulsions are obtained. The addition of the hydrophilic vinyl monomer also increases the polymerization rate and the polymerization ratio. It can be seen, therefore, that the hydrophilic vinyl monomer is also an indispensable component in the method of the present invention. As such a hydrophilic monomer, a monomer selected from below described classes of monomers and mixtures thereof is advantageously employed.

(A) A derivative of an acrylic acid or methacrylic acid ester of the formula:

Formula A wherein $R_1$ stands for H or $CH_3$, $R_2$ stands for an alkylene group having 2–6 carbon atoms, a cycloalkylene group having 5–6 carbon atoms or phenylene, M is a member selected from the group consisting of H, Na, K and $-NR_3R_4R_5R_6$, and $R_3$, $R_3$, $R_5$ and $R_6$ respectively stand for H or an alkyl group having 1–4 carbon atoms. Typical examples are sulfoethyl ester, sulfobutyl ester, sulfocyclohexyl ester, sulfo-(2-ethyl)-hexyl ester, sulfophenyl ester of acrylic acid or methacrylic acid and sodium, potassium, ammonium, and amine salts thereof.

(B) A styrene sulfonic acid or a derivative thereof of the formula:

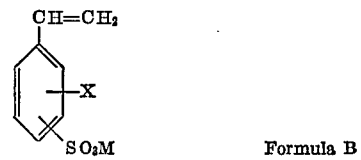

Formula B wherein X stands for $-H$, $-OH$, $-Cl$ or an alkyl group having 1–2 carbon atoms and M has the meaning assigned above. Typical examples are o-, m-, or p-styrene sulfonic acid, 2-chloro-4 vinyl benzene sulfonic acid, 2-methyl-4 vinyl benzene sulfonic acid, 2-hydroxy-4 vinyl benzene sulfonic acid and sodium, potassium, ammonium and amine salts thereof.

(C) A methallyl sulfonic acid or a salt thereof of the formula:

Formula C wherein M has the meaning assigned above. Typical examples are methallyl sulfonic acid and sodium potassium, ammonium, and amine salts thereof.

(D) A methacrylamide derivative of the formula:

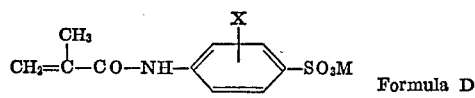

Formula D wherein M and X have the meaning assigned above. Typical examples are p-methacrylamide benzene sulfonic acid, o-hydroxy p-methacrylamide benzene sulfonic acid, m-methyl p-methacryl amide benzene sulfonic acid, o-chloro p-methacrylamide benzene sulfonic acid and sodium, potassium, ammonium and amine salts thereof, (E) A methallyl ether derivative of the formula

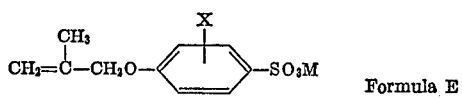

Formula E wherein M and X have the meaning assigned above. Typical examples are p-methallyl-oxy-benzene sulfonic acid, o-hydroxy p-methallyl-oxy-benzene sulfonic acid, m-chloro p-methallyl-oxy benzene sulfonic acid ester and sodium, potassium, ammonium and amine salts thereof.

In accordance with the method of the present invention, up to 10 parts by weight of at least one other polymerizable monomer can be added to the monomer mixture if desired.

In the process of the present invention it is very important that the monomer mixture be comprised of at least the three components, namely acrylonitrile, a polymerizable vinyl monomer which is more hydrophobic than acrylonitrile and a hydrophilic vinyl monomer or the salts thereof. In addition it is essential that the respective components be present in the mixture in the aforementioned percentages by weight in the method of the present invention. If such conditions are not satisfied, the objects of the present invention are not obtained.

When a monomer mixture satisfying all of the above conditions is polymerized in a reaction medium consisting essentially of 60–85% by weight of dimethyl sulfoxide and 40–15% by weight of water, an emulsion having very fine polymer particles is obtained using either batch or continuous processes.

Even though the concentration of the polymer is very high, the emulsion that is obtained has a low viscosity, and good stability.

The preferred mixing ratio of dimethyl sulfoxide and water in the reaction medium employed in the method of the present invention is dependent upon the particular hydrophilic monomer employed. The preferable mixing ratios are as follows:

(1) When an acrylic acid or methacrylic acid ester derivative defined by the Formula A is used the mixing ratio of dimethyl sulfoxide and water should be 65:35–85:15 and more preferably 70:30–80:20.

(2) When a styrene sulfonic acid or a derivative thereof defined by the Formula B is used, the mixing ratio of dimethyl sulfoxide and water should be 65:35–85:15 and preferably 70:30–80:20.

(3) When methallyl sulfonic acid or a salt thereof shown by the Formula C is used, the mixing ratio of dimethyl sulfoxide and water should be 60:40–80:20 and more preferably 65:35–75:25.

Recently, the demand for fiber of the acrylonitrile series for use in clothings and interior fabrics such as carpeting, bedding, and drapes, has substantially increased. It has accordingly been necessary to impart flame retardant properties to the acrylonitrile fibers used to make these fabrics. Copolymers of acrylonitrile and vinyl chloride or vinylidene chloride has been proposed for this purpose. The method of the present invention is especially well suited for the production of such a flame resistant acrylic copolymer fiber. For example, flame resistant fibers are obtained by polymerizing a monomer mixture consisting essentially of (1) 80–19.7% by weight of acrylonitrile, (2) 19.7–80% by weight of a monomer selected from the group consisting of vinyl chloride, vinylidene chloride and a mixture thereof, and (3) 0.3–10% by weight of a monomer selected from the group consisting of monomers of Formula A. The acrylic copolymers obtained as a result have excellent fiber forming and flame retardant properties.

In the present invention, the ratio of the monomer mixture to the solvent when practicing the polymerization process of this invention should be such that the concentration of the monomer mixture in the solvent mixture is not more than 60% by weight and preferably not more than 50% by weight. When the concentration of the monomer exceeds 60% by weight, gelation takes place after the reaction starts and the monomer mixture cannot be stirred. In addition, when the concentration of the monomer is high, the reaction is stopped at a low ratio of polymerization and a polymer emulsion having a low viscosity is obtained. The problem of recovering the unreacted monomer makes the process practical. The method of the present invention may be practiced using a low concentration of the monomer mixture, however, it is preferable that the concentration be at least 20% by weight.

In accordance with the present invention, it is preferable to carry out the reaction in the absence of oxygen since oxygen apparently interferes with the polymerization reaction. Normally, the polymerization is carried out in an inert gas atmosphere such as nitrogen or carbon dioxide.

The polymerization method employed is not critical. The polymerization can be conducted by the batch process, semi-batch process or continuous process and with each process polymer emulsion having good stability, a high polymer concentration and a low viscosity may be obtained.

As a polymerization initiator, an azo compound is normally used as a source for generating a radical, or an organic or inorganic peroxide is used. As an azo compound, $\alpha,\alpha'$-azobis ($\alpha,\alpha'$-dimethylvaleronitrile) is effective in terms of the polymerization rate and coloration. As a peroxide, an oxidation-reduction system consisting of an organic peroxide such as aliphatic diacyl peroxides or peroxy esters and a reducing agent, or an oxidation-reduction system consisting of a persulfate and sulfurous acid gas. A bisulfate or iron ion is especially effective from the viewpoints of the polymerization ratio and coloration. Further, when iron ion exists in the oxidation-reduction system a preferably result is obtained.

That the polymerization process of the present invention is different from the conventional polymerization process is apparent from the drawings. FIG. 1, which is a photomicrograph showing the dispersed state of the polymer, is obtained by the method of the present invention. As is apparent from this photomicrograph, the polymer is dispersed in a colloidal state and the polymer particles are not agglomerated. For this reason polymerization at a high concentration is possible.

Figure 2:
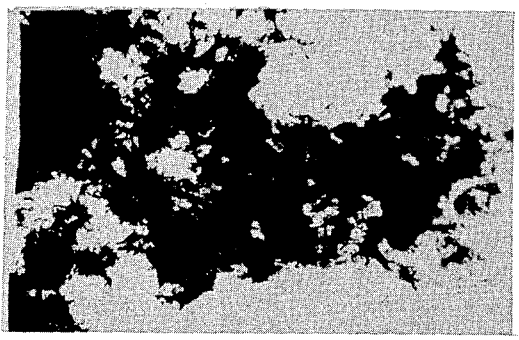
FIG. 2 is a photomicrograph showing the polymer in the dispersed state obtained by a conventional process using a mixture of dimethyl sulfoxide and water as the reaction medium (Japanese patent publication 10,996/1961).

FIG. 2 is a photomicrograph showing a dispersed state of a polymer obtained by polymerizing 93.0% by weight of acrylonitrile, 6.0% by weight of methylacrylate and 1.0% by weight of sodium allylsulfonate in a dimethyl sulfoxide-water (75/25) reaction medium. As is apparent from FIG. 2, the polymer particles are agglomerated and accordingly, the viscosity of the dispersion is quite high, which makes it difficult to obtain a highly concentrated polymer emulsion.

Figure 3:
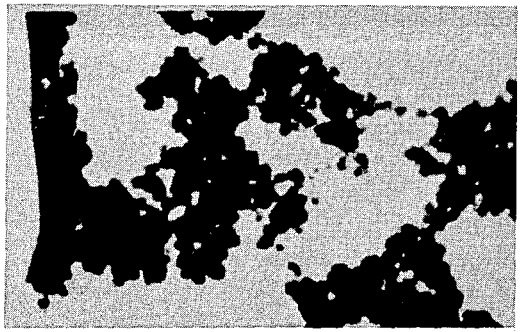
FIG. 3 is a photomicrograph showing the polymer in the dispersed state of polymer obtained by a conventional aqueous emulsion polymerization process.

FIG. 3 is a photomicrograph showing the dispersed state obtained by polymerizing 58.0% by weight of acrylonitrile, 40.0% by weight of vinylidene chloride and 2.0% by weight of sulfopropyl methacrylate sodium salt in water containing an emulsifier. As is apparent from FIG. 3, though the polymer particles are dispersed in the water, the polymer particles are somewhat agglomerated so that the viscosity of the emulsion is high.

The polymer emulsion of this invention can be spun into fibers by distilling off water or by adding additional dimethyl sulfoxide to the solution or by concurrently using both methods to provide a spinning solution which can be directly spun into fibers. When the concentration of the polymer in the polymer emulsion is relatively low it is possible to obtain a solution having a viscosity suitable for spinning (above about 50 poises) by distilling off the water in the emulsion. Since this method requires that a relatively large amount of water be distilled off, it requires a considerable amount of heat. On the other hand, when the concentration of the polymer in the polymer emulsion is high, a solution having a viscosity suitable for spinning is easily obtained by diluting the polymer emulsion with dimethyl sulfoxide.

From the viewpoint of the ease of operability of the spinning step and the physical properties of the obtained filaments it is most preferable to dilute a concentrated polymer emulsion with dimethyl sulfoxide and thereafter distill off a part of the water.

According to the process of the present invention, copolymers containing acrylonitrile having excellent properties may be produced very efficiently and economically.

The following examples are given by way of further illustration of the process of the present invention and are not intended to limit the scope of the invention beyond that of the subjoined claims. All parts and percentages in the examples are parts and percentages by weight, not volume, unless otherwise noted.

EXAMPLE 1

Using vinylidene chloride whose solubility in water is almost zero as the polymerizable hydrophobic vinyl monomer, the influence of the content of vinylidene chloride in a monomer mixture on the properties of a polymer emulsion was determined.

In a 500 cc. glass flask, 40 parts of a monomer mixture consisting of acrylonitrile and vinylidene chloride in amounts expressed by percent in Table 1, and 2% of the sodium salt of methacrylic acid sulfopropylester was added to 60 parts of a mixed dimethyl sulfoxide/water (75/25) reaction medium. 0.1 part of ammonium persulfate, 0.2 part of sodium bisulfite, 0.01 part of sulfuric acid and 1 p.p.m. of $Fe^{+++}$ was added as the catalyst. The mixture was polymerized batchwise at 40° C. for 4 hours in a nitrogen atmosphere. The properties of the resulting polymer emulsion are shown in Table 1.

Run No. 1 and No. 2 were experiment cases wherein the ratios of vinylidene chloride was less than the specified range of the present invention. When the polymerization reaction proceeded and the concentration of the polymer in the polymer slurry reached a certain point, the reaction contents solidified and could not be stirred.

Run Nos. 3–7 were experiments wherein the conditions of the present invention were satisfied. As the ratio of the hydrophobic vinylmonomer was increased, despite the fact that the polymer concentration in the polymer emulsion was very high, low viscosity emulsions were obtained with increased stability. However, when the ratio of the hydrophobic vinylmonomer was increased to 90% as in Run No. 9, the viscosity of the polymer emulsion was still low, but the emulsion was unsatisfactory because hard granules were present in the emulsion.

EXAMPLE 2

Example 1 was repeated except that methyl acrylate whose solubility in water was 5.2% (at 20° C.) was used as the polymer hydrophobic vinylmonomer. The influence of the contact of methyl acrylate in the monomer mixture on the properties of a polymer emulsion was evaluated. The results are shown in Table 2.

As in Example 1, when the ratio of methyl acrylate which is the hydrophobic vinylmonomer was not more than 15% the reaction mixture gelled before the completion of the reaction.

In Run No. 8, hard granules were produced in the polymeric emulsion.

TABLE 2

| | Monomer mixture | | Properties of the emulsion | | | |
|---|---|---|---|---|---|---|
| | Methyl-acrylate (percent) | Acrylo-nitrile (percent) | Emulsion viscosity (centipoise) | Polymerization ratio (percent) | Polymer concentration (percent) | Stability of the emulsion |
| Run number: | | | | | | |
| 1 | 0 | 98 | (¹) | (¹) | (¹) | Gelled 10 min. after the reaction started. |
| 2 | 15 | 83 | (¹) | (¹) | (¹) | Gelled 15 hrs. after the reaction started. |
| 3 | 25 | 73 | 3,800 | 96.3 | 38.5 | Did not gel until 5 days after the reaction ended. |
| 4 | 35 | 63 | 530 | 97.2 | 38.9 | Did not gel on 30th day after the reaction ended. |
| 5 | 55 | 43 | 180 | 95.4 | 38.2 | Do. |
| 6 | 70 | 28 | 73 | 98.0 | 26.4 | Do. |
| 7 | 80 | 18 | 54 | 94.3 | 37.7 | Do. |
| 8 | 90 | 8 | 40 | 96.8 | 38.7 | Do. |

¹ Could not be measured.

EXAMPLE 3

Example 1 was repeated except that compounds shown in Table 3 were used in place of vinylidene chloride to determine the influence of differences in hydrophobic properties of the vinyl monomer on the properties of the resulting emulsion.

In a 500 cc. glass flask a mixture was charged comprised of 40 parts of a monomer mixture consisting of 43% of acrylonitrile, 55% of another polymeric vinyl monomer and 2% of sodium salt of methacrylic acid sulfopropylester, 60 parts of a mixed dimethyl sulfoxide/water (75/25) medium, 0.1 part of ammonium persulfate, 0.2 part of sodium bisulfite, 0.01 part of sulfuric acid and 1 p.p.m. of $Fe^{+++}$. The mixture was polymerized batchwise at 40° C. for 4 hours in a nitrogen atmosphere. The properties of the resulting polymer emulsions are shown in Table 3.

TABLE 1

| | Monomer mixture | | Properties of the emulsion | | | |
|---|---|---|---|---|---|---|
| | Vinylidene chloride | Acrylo-nitrile | Emulsion viscosity (centipoise) | Polymerization ratio (percent) | Polymer concentration (percent) | Stability of the polymer emulsion |
| Run number: | | | | | | |
| 1 | 0 | 98 | (¹) | (¹) | (¹) | Gelled 10 min. after the reaction started. |
| 2 | 15 | 83 | (¹) | (¹) | (¹) | Gelled 1 hour after the reaction started. |
| 3 | 25 | 73 | 7,800 | 92.3 | 26.9 | Did not gel until 5 hours after reaction ended. |
| 4 | 35 | 63 | 980 | 92.1 | 36.8 | Did not gel until 3 days after reaction ended. |
| 5 | 55 | 43 | 80 | 92.5 | 37.0 | Was not gelled on 30th day after reaction ended. |
| 6 | 70 | 28 | 18 | 85.4 | 34.2 | Do. |
| 7 | 80 | 18 | 10 | 76.3 | 30.5 | Do. |
| 8 | 90 | 8 | 3 | 53.4 | 21.4 | Do. |

¹ Could not be measured.

TABLE 3

| Run number: | Name of a monomer copolymerized with acrylonitrile | Emulsion viscosity (centipoise) | Polymerization ratio (percent) | Polymer concentration (percent) | Shape of the emulsified polymer |
|---|---|---|---|---|---|
| 1 | Acrylic acid | (1) | (2) | (2) | (2) |
| 2 | Hydroxy ethyl acrylate | (1) | (2) | (2) | (2) |
| 3 | Itaconic acid | (1) | (2) | (2) | (2) |
| 4 | Vinylidene chloride | 80 | 92.5 | 37.0 | Good. |
| 5 | Methyl acrylate | 180 | 95.4 | 38.2 | Do. |
| 6 | Methyl methacrylate | 125 | 92.6 | 37.0 | Do. |
| 7 | Styrene | 95 | 96.9 | 38.8 | Do. |
| 8 | Vinyl acetate | 130 | 92.3 | 35.9 | Do. |

[1] Could not be measured.
[2] Gelated until the reaction ended and could not be stirred.

Run Nos. 1–3 were experiments wherein polymerizable vinyl monomers more hydrophilic than acrylonitrile were copolymerized. In each experiment the reaction mixture solidified before completion of the polymerization and could not be stirred. In contrast thereto, Runs Nos. 4–8 were experiments wherein a polymer and vinyl monomer, more hydrophobic than acrylonitrile was copolymerized. In each of these experiments a polymer emulsion having satisfactory properties was obtained.

EXAMPLE 4

The effect of using a salt of acrylic acid sulfoalkyl ester and salt of methacrylic acid sulfoalkyl ester as the hydrophobic vinyl monomer on the properties of a polymer emulsion was evaluated.

In a 500 cc. glass flask a mixture was charged comprised of 40 parts of a monomer mixture having the composition shown in Table 4. 60 parts of a dimethyl sulfoxide/water (75/25) reaction medium 0.1 part of ammonium persulfate, 0.2 part of sodium bisulfite, 0.01 part of sulfuric acid and 1 p.p.m. of $Fe^{+++}$. The mixture was polymerized batchwise at 40° C. in a nitrogen atmosphere for 4 hours. The properties of the obtained polymer emulsions are shown in Table 4.

action proceeded. The reaction system separated into phases, a viscous phase and the reaction medium. An emulsion having dispersed particles of the desired shape was not produced and the polymerization rate and the polymerization ratio were both low. When acrylic acid sulfoalkylester was employed, it resulted in an emulsion whose particle shapes were somewhat poor as compared with the experiment wherein methacrylic acid sulfoalkylester was used.

EXAMPLE 5

The effect of the ratio of dimethyl sulfoxides and water in the dimethyl sulfoxide/water reaction medium on the type of the polymer emulsion was evaluated.

In a 500 cc. glass flask a mixture was charged comprised of 40 parts of monomer mixture consisting of 43% of acrylonitrile, 55% of methyl acrylate and 2% of a sodium salt of methacrylic acid sulfocyclohexyl ester, 60 parts of mixed dimethyl sulfoxide/water, 0.1 part of sulfuric acid, and 1 p.p.m. of $Fe^{+++}$. The mixture was polymerized batchwise at 40° C. for 4 hours in a nitrogen atmosphere. The properties of the resulting polymer emulsions are shown in Table 5.

TABLE 5

| | Composition of a mixed DMSO/water medium, percent | | Properties of the emulsion | | | |
|---|---|---|---|---|---|---|
| | DMSO | Water | Emulsion viscosity (centipoises) | Polymerization ratio (percent) | Polymer concentration (percent) | Type of emulsion |
| Run number: | | | | | | |
| 1 | 95 | 5 | 3,200 | 45.8 | 18.2 | Uniform solution. |
| 2 | 85 | 15 | 2,300 | 69.3 | 34.9 | Dissolved emulsion. |
| 3 | 80 | 20 | 360 | 91.8 | 36.7 | Good. |
| 4 | 75 | 25 | 135 | 95.9 | 38.4 | Do. |
| 5 | 70 | 30 | 95 | 96.8 | 38.7 | Do. |
| 6 | 65 | 35 | 50 | 98.2 | 39.3 | Solid existed. |
| 7 | 60 | 40 | (1) | (1) | (1) | Various solids, separated. |

[1] Could not be measured.
NOTE.—DMSO=Dimethyl sulfoxide.

When water was present in the amount of 5% as in Run No. 1, the polymerization mixture became a uni-

TABLE 4

| Run number | Monomer mixture—composition (percent) | Emulsion viscosity (centipoise) | Polymerization ratio (percent) | Polymer concentration (percent) | Shape of the polymer in the emulsion |
|---|---|---|---|---|---|
| 1 | Acrylonitrile/vinylidene chloride/SPMA, 43/55/2 | 80 | 92.5 | 37.0 | Good. |
| 2 | Acrylonitrile/vinylidene chloride, 44/56 | (1) | 31.6 | 12.6 | Separated into 2 phases of a viscous matter and the medium. |
| 3 | Acrylonitrile/methyl acrylate/SPMA, 43/55/2 | 180 | 95.4 | 38.2 | Good. |
| 4 | Acrylonitrile/methyl acrylate/SPA, 43/55/2 | 1,250 | 93.8 | 37.5 | Not gelled on 1st day after reaction ended. |
| 5 | Acrylonitrile/methyl acrylate, 44/56 | (1) | 52.3 | 20.9 | Separated into 2 phases of a viscous matter and the medium. |

[1] Could not be measured.

NOTE.—SPMA=Sodium salt of methacrylic acid sulfopropylester; SPA=Sodium salt of acrylic acid sulfopropylester.

In Run Nos. 1, 3, and 4, when acrylic acid or methacrylic acid sulfoalkylester or a salt was employed as the hydrophilic monomers thereof and the mixture polymerized, a uniform emulsion having a preferable shape was obtained. In contrast, in Runs Nos. 2 and 5, when acrylonitrile was copolymerized with only a polymerizable vinyl monomer, more hydrophilic than acrylonitrile as the reform solution. The polymerization rate was very slow and the polymerization ratio was low.

When the water was 15% or higher as the polymerization reaction proceeded, the polymerization to exhibit the form of emulsion polymerization system. The polymerization rate increased. The polymerization ratio and polymerization degree increased.

However, when the water exceeded 40%, as the reaction proceeded, hard granular polymer particles separated out of the reaction system and the system could not be stirred. Accordingly, it can be seen that the ratio of dimethyl sulfoxide/water in the reaction medium is an important factor in the present invention.

EXAMPLE 6

The effect of varying the ratio of a monomer mixture to the dimethyl sulfoxide/water reaction medium on the properties of a polymer emulsion was evaluated.

In a 500 cc. glass flask, a mixture was charged comprised of a monomer mixture consisting of 43% of acrylonitrile, 35% of vinylidene chloride and 2% of sodium salt of methacrylic acid sulfopropylester, a mixed dimethyl sulfoxide/water (75/25) medium, 0.1 part of ammonium persulfate, 0.2 part of sodium bisulfite, 0.01 part of sulfuric acid and 1 p.p.m. of $Fe^{+++}$. The resulting mixture was polymerized batchwise at 40° C. for 4 hours in a nitrogen atmosphere. The properties of the obtained polymer emulsion are shown in Table 6.

TABLE 6

| Run number | Monomer/medium ratio | | Properties of the emulsion | | | |
|---|---|---|---|---|---|---|
| | Monomer (part) | Medium (part) | Emulsion viscosity (centipoise) | Polymerization ratio (percent) | Polymer concentration | Stability of the polymer emulsion when it was left to stand |
| 1 | 10 | 90 | 12 | 90.5 | 9.1 | Not gelled on the 30th day after the reaction ended. |
| 2 | 20 | 80 | 30 | 91.8 | 18.4 | Do. |
| 3 | 40 | 60 | 80 | 92.5 | 37.0 | Do. |
| 4 | 50 | 50 | 150 | 91.8 | 45.9 | Not gelled until 7 days after the reaction ended. |
| 5 | 60 | 40 | 2,540 | 92.9 | 55.7 | Not gelled until 1 day after the reaction ended. |
| 6 | 70 | 30 | (¹) | (¹) | (¹) | Gelled 1 hour after the reaction started and could not be stirred. |

¹ Could not be measured.

As the concentration of the monomers increased, namely, as the polymer concentration in the polymer emulsion increased, the emulsion viscosity likewise increased. When the monomer concentration reached 70%, the reaction system gelled 1 hour after the reaction started and could not be stirred. When a high monomer concentration was employed and the reaction was stopped at a low polymerization ratio, a low viscosity polymer emulsion was obtained. However, because of the problem of recovering the unreacted monomer this process was not considered to be practical.

EXAMPLE 7

The effect of using as a polymerization initiator, a peroxide alone, an oxidation-reaction system consisting of peroxide and a reducing agent, and an azo compound on the properties of the resulting polymer emulsions was evaluated.

In a 500 cc. glass flask a mixture was charged comprising 40 parts of a monomer mixture consisting of 43% of acrylonitrile, 55% of vinylidene chloride and 2% of sodium salt of methacrylic acid sulfopropylester, 60 parts of a mixed dimethyl sulfoxide/water (75/25) medium and 0.01 part of sulfuric acid. To separate samples of this mixture, various kinds of polymerization initiators were added, and the content was polymerized batchwise at 40° C. in a nitrogen atmosphere. The properties of the obtained polymer emulsions were shown in Table 7.

TABLE 7

| Run number | Initiators | Polymerization time (1 hr.) | Properties of the emulsion | | | |
|---|---|---|---|---|---|---|
| | | | Emulsion viscosity (centipoise) | Polymerization time ratio (percent) | Polymer concentration (percent) | Coloration ratio (percent) |
| 1 | 0.1 part of ammonium persulfate plus 0.2 part of sodium bisulfite plus 1 p.p.m. of $Fe^{+++}$. | 4 | 80 | 92.5 | 37.0 | 73.6 |
| 2 | 0.05 part of $\alpha,\alpha'$-azobis($\alpha$-dimethylvaleronitrile). | 20 | 135 | 90.1 | 36.0 | 71.8 |
| 3 | 0.05 part of terbutyl-peroxy pivalate | 20 | 120 | 66.3 | 34.5 | 65.2 |

The coloration ratio was obtained by diluting the emulsion 2.2 times with dimethyl sulfoxide to make it a uniform solution. The solution was placed in a 1 cm. thick quartz cell and the percent transmission was measured at 400 m. by a Hitachi visible spectrophotometer with distilled dimethyl sulfoxide as a symmetry liquid and comparing the measured percentages.

From the viewpoint of the polymerization rate and coloration, an oxidation-reduction system consisting of ammonium persulfate-sodium bisulfite-$Fe^{+++}$ was most preferable.

EXAMPLE 8

Dimethyl sulfoxide was added to the polymer emulsion obtained in Run No. 1 of Example 7 to convert the emulsion into a spinning solution. The relationship of the amount of dimethyl sulfoxide added to the type of the solution, solution viscosity, possibility of direct spinning, spinnability, and yarn quality is shown in Table 8 below.

TABLE 8

| Run number | Adding amount of DMSO (9%) based on 100 parts of the emulsion | Form of the solution | Solution viscosity (poise) | Possibility of direct spinning | Spinnability and yarn quality |
|---|---|---|---|---|---|
| 1 | 0 | White emulsion | 0.8 | Impossible | |
| 2 | 20 | Separated into gel and emulsion | | do | |
| 3 | 40 | Emulsified viscous slurry | | do | |
| 4 | 60 | Uniform transparent solution | 1,250 | Possible | Poor. |
| 5 | 80 | do | 420 | do | Good. |
| 6 | 100 | do | 200 | do | Do. |
| 7 | 140 | do | 100 | do | Do. |
| 8 | 180 | do | 50 | do | Do. |
| 9 | 200 | do | 13 | do | Poor. |

NOTE.—DMSO=Dimethyl sulfoxide.

When the polymer concentration in the polymer emulsion was close to 40%, the dilution of 100 parts of the emulsion with 60–180 parts of dimethyl sulfoxide resulted in a satisfactorily uniform solution for spinning. When the polymer concentration in the polymer emulsion was further reduced by being diluted with additional dimethyl sulfoxide, the viscosity became too low. It was then necessary to distill off water from the polymer emulsion to make it a uniform solution suitable for spinning.

EXAMPLE 9

The properties of a polymer emulsion when semi-batch polymerization was carried out, were evaluated.

In a 1.5 liter flask equipped with a stirrer and a jacket, a mixture was charged comprised of 58 parts of a mixed dimethyl sulfoxide/water (77/23) medium, 0.2 part of sodium bisulfite and 1 p.p.m. of $Fe^{+++}$.

The temperature was maintained at 40° C. and the flask was sealed with nitrogen.

Thereafter, 42 parts of a monomer mixture (acrylonitrile/vinylidene chloride/sodium salt of methacrylic acid sulfopropyl ester=50%/48%/2%) and 0.1 part of ammonium persulfate were continuously supplied to said flask over a 2 hours period. After supplying all the monomer and ammonium persulfate, the reaction was continued for an additional 3 hours. The reaction was completed 5 hours after the reaction started.

The characteristic values of the polymer emulsion at the point when the reaction was completed were as follows:

Polymerization ratio _____percent__ 91.3
Polymer concentration _____do____ 38.3
Emulsion viscosity _____centipoises__ 135
Polymer specific viscosity, $\eta_{sp}$. _____ 0.596

The polymer specific viscosity $\eta_{sp}$. was measured at a concentration of 3 g./l. in a dimethyl formamide solution of 0.1 N rhodan sodium at 25° C.

The obtained polymer emulsion was so stable that when it was left to stand at room temperature for 30 days, it still did not gel.

TABLE 9

| Spinning solution | Spinnability (m./meter) | Stretchability (times) | Dry tenacity (g./d.) | Elongation (percent) | Degree of whiteness |
|---|---|---|---|---|---|
| No. 1 | 8.6 | 7.0 | 2.9 | 23 | High. |
| No. 2 | 12.0 | 9.5 | 3.0 | 23 | Slightly yellowish. |

EXAMPLE 10

The solution obtained in Run No. 6 of Example 8 (ratio of water content about 6.5%) was named spinning solution No. 1 and a solution obtained by treating said spinning solution No. 1 in an evaporator to distill off water under a reduced pressure of 40 mm. Hg until the ratio of water content was about 2% and was named spinning solution No. 2 (viscosity 315 poises).

After these two spinning solutions were filtered and defoamed, the solutions were spun into a 50% aqueous solution of dimethyl sulfoxide from a spinneret having 7000 orifices each having a diameter of 0.08 mm. Thereafter the spun filaments were subjected to normal drawing, washing with water, relaxing and drying. The spinning condition and the physical properties of the resulting yarns are shown in Table 9.

From the view point of the spinning condition such as spinnability and stretchability and luster of the obtained yarn, the solution diluted with dimethyl sulfoxide and thereafter distilled to remove water (spinning solution No. 2) was more superior. However, because heat was added upon distilling off water, the degree of whiteness was reduced.

EXAMPLE 11

A mixture of 42 parts of a monomer mixture consisting of 50% of acrylonitrile, 48% of vinylidene chloride, and 2% of sodium salt of methacrylic acid sulfopropylester, 58 parts of a mixed dimethyl sulfoxide/water (78/21) medium 0.2 part of sodium bisulfite and 1 p.p.m. of $Fe^{+++}$, and a concentrated aqueous solution of 0.1 part of part of ammonium persulfate were continuously supplied at a speed of 2 liters per hour to a continuous polymerization vessel consisting of three 5-liter complete mixing vessels connected in a series. The reaction temperature of each vessel was 40° C. Each vessel was completely sealed with nitrogen. The polymer emulsion which flowed out from a third vessel had a viscosity of 75 centipoises, a polymerization ratio of 89.5% a polymer concentration of 37.6% and a polymer specific viscosity $\eta_{sp.}$ of 0.520. All of these characteristic values were quite satisfactory. The stability of the obtained polymer emulsion was very good.

When approximately the same concentrations of the polymerization initiators and approximately the same temperature-time conditions were adapted, the attained polymerization ratio was the highest by the batch process followed by the semi batch process and the continuous process.

EXAMPLE 12

The effect of styrene sulfonic acid or a derivative thereof or a salt thereof as the hydrophilic component on the properties of a polymer emulsion was evaluated.

In a 500 cc. glass flask, 40 parts of a monomer mixture having the composition shown in Table 12, 60 parts of a mixed dimethyl sulfoxide/water (75/25) medium, 0.1 part of ammonium persulfate, 0.2 part of sodium bisulfite, 0.01 part of sulfuric acid and 1.5 p.p.m. of $Fe^{+++}$ were charged. The reaction mixture polymerized batchwise at 40° C. for 4 hours in a nitrogen atmosphere. The properties of the resulting polymer emulsions are shown in Table 12 below.

TABLE 12

| | | Properties of the emulsion | | | |
|---|---|---|---|---|---|
| Run number | Monomer mixture—composition (percent) | Emulsion viscosity (centipoise) | Polymerization ratio (percent) | Polymer concentration (percent) | Type of the emulsion |
| 1 | Acrylonitrile/vinylidene chloride 12-Me-p-SSS, 43/55/2. | 85 | 93.8 | 37.5 | Good. |
| 2 | Acrylonitrile/vinylidene chloride, 44/56 | (¹) | 31.8 | 12.6 | Separated into 2 phases of a viscous matter and the medium. |
| 3 | Acrylonitrile/methyl acrylate 12-Me-p-SSS, 43/55/2. | 230 | 94.7 | 37.9 | Good. |
| 4 | Acrylonitrile/methyl acrylate 44/56 | (¹) | 52.3 | 20.9 | Separated into 2 phases of a viscous matter and the medium. |

¹ Could not be measured.

NOTE.—2-Me-p-SSS=Sodium salt of 2-methyl-4-vinyl benzenesulfonic acid.

In Runs Nos. 1 and 3 styrene sulfuric acid or a derivative thereof for a salt thereof as the hydrophilic monomer was copolymerized and a uniform emulsion was obtained. In contrast, in Runs Nos. 2 and 4, in which acrylonitrile was copolymerized with a more hydrophobic polymerizable vinyl monomer than acrylonitrile as the reaction proceeded, the reaction system was separated into two phases, a viscous phase and the reaction medium. An emulsion having a satisfactory dispersion was not obtained. The polymerization rate and the polymerization ratio were both low.

From the similar experiment, it was recognized that when derivatives of styrene sulfonic acid other than 2-methyl-4-vinylbenzene sulfonic acid and a salt there were used, similar results as noted above were obtained. However, when p-styrenesulfonic acid, 2-methyl-4-vinylbenzenesulfonic acid and a salt thereof were used the type of emulsions were excellent.

From the viewpoint of the spinning situations such as spinnability and stretchability, and luster of the obtained yarn, the solution diluted with dimethyl sulfoxide and distilling off water (spinning solution No. 2) was more preferable. However, because heat was added upon distilling off water, the degree of whiteness lowered and therefore some attention was required.

EXAMPLE 13

A mixture of 42 parts of a monomer mixture consisting of 50% of acrylonitrile, 48% of vinylidene chloride and 2% of sodium methallylsulfonate, 38 parts of a mixed dimethyl sulfoxide/water (74/26) medium, 0.2 part of sodium bisulfite and 1 p.p.m. of $Fe^{+++}$, and a concentrated aqueous solution of 0.1 part of ammonium persulfate were continuously supplied at a speed of 2 liters per hour to a continuous polymerization vessel consisting of three 5-liter complete mixing vessels connected in series. The reaction temperature at each vessel was 40° C. Each vessel was completely sealed with nitrogen. A polymer emulsion flowed out from a third vessel and had a viscosity of 90 centiposies, a polymerization ratio of 83.8%, a polymer concentration of 35.2% and a polymer specific viscosity $\eta_{sp}$ of 0.501, and all of these characteristic values were satisfactory. The stability of the obtained polymer emulsion was very good.

When roughly the same concentrations of the initiators and roughly the same temperature-time conditions were adopted, the attained polymerization ratio was the highest by the batch process, followed by the semi-batch process and the continuous process.

EXAMPLE 14

To a glass flask (500 cc.), 40 parts by weight of monomer mixture consisting of 58% by weight of acrylonitrile, 40% by weight of methylmethacrylate and 2% by weight of p-methallylamine benzene sulfonic acid sodium salt, 60 parts by weight of reaction medium consisting of 75% by weight of dimethyl sulfoxide and 25% by weight of water, 0.1 part by weight of ammonium persulfate, 0.2 part by weight of sodium bisulfite, 0.01 part by weight of sulfonic acid and 1 p.p.m. of $Fe^{+++}$ were added. The mixture was reacted at about 50° C. for 3 hours under nitrogen atmosphere.

The results are shown as follows:

Viscosity of polymer emulsion _____ centipoises__ 98
Concentration of polymer in the emulsion
    percent by weight__ 36.9
Conversion _____do____ 92.3
Stability of the emulsion _____ Good

EXAMPLE 15

The same procedure as Example 14 was repeated except using p-methacryl oxy benzene sulfonic acid sodium salt instead of using p-methacrylamide benzene sulfonic acid sodium salt.

The results are shown as follows:

Viscosity of polymer emulsion _____ centipoises__ 121
Concentration of polymer in the emulsion
    percent by weight__ 37.4
Conversion _____do____ 93.5
Stability of the emulsion _____ Good

What is claimed is:

1. A method of producing an acrylic copolymer comprising polymerizing a monomer mixture consisting essentially of (1) 80–19.7% by weight acrylonitrile, (2) 19.7–80% by weight of a hydrophobic vinyl monomer selected from the group consisting of styrene, vinyl acetate, vinyl ether, vinyl chloride, vinylidene chloride, methacrylonitrile, and acrylic acid ester having 5–12 carbon atoms and mixtures thereof, and (3) 0.3–10% by weight of a hydrophilic vinyl monomer selected from the group consisting of:

(A) an acrylic monomer of the formula:

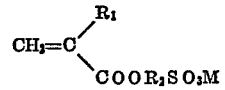

(B) a styrene derivative of the formula:

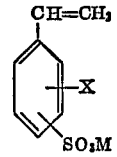

(C) a methallyl monomer of the formula:

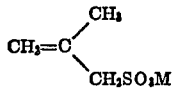

(D) a methacrylamide derivative of the formula:

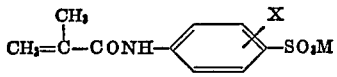

(E) a methallyl ether of the formula:

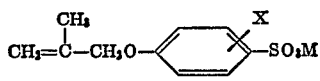

and
(F) mixtures thereof,
wherein $R_1$ is H of $CH_3$, $R_2$ is a member selected from the group consisting of alkylene groups having 2–6 carbon atoms, cycloalkylene groups having 5–6 carbon atoms, and phenylene; and M is H, Na, K or $NR_3, R_4, R_5, R_6$ where $R_3, R_4, R_5$ and $R_6$ each represent H or an alkyl having 1–4 carbon atoms and X is H, OH, Cl, or alkyl having 1–2 carbon atoms in a reaction medium consisting essentially of 85–60% by weight of dimethyl sulfoxide and 15–40% by weight of water.

2. The method of producing acrylic copolymers according to claim 1 which comprises polymerizing a monomer mixture consisting essentially of (1) 80–19.7% by weight of acrylonitrile, (2) 19.7–80% by weight of a vinyl monomer selected from the group consisting of styrene, vinyl acetate, vinyl ether, vinyl chloride, vinylidene chloride, methacrylonitrile, acrylic acid ester of alcohol having 1–8 carbon atoms, methacrylic acid ester of alcohol having 1–8 carbon atoms and mixtures thereof, and (3) 0.3–10% by weight of an acrylic monomer of the formula:

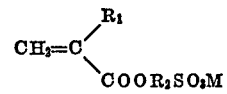

wherein $R_1$ is H or $CH_3$, $R_2$ is a member selected from carbon atoms and phenylene, and M is H, Na, K or $NR_3R_4R_5R_6$ where $R_3, R_4, R_5$ and $R_6$ each represent H or alkyls having 1–4 carbon atoms, in a reaction medium consisting essentially of 85–65% by weight of dimethyl sulfoxide and 15–35% by weight of water.

3. The method of producing acrylic copolymers according to claim 1 which comprises polymerizing a monomer mixture consisting essentially of (1) 80–19.7% by weight of acrylonitrile, (2) 19.7–80% by weight of vinyl monomers selected from the group consisting of styrene, vinyl acetate, vinyl ether, vinyl chloride, vinylidene chloride, methacrylonitrile, acrylic acid ester of alcohol having 1–8 carbon atoms, methacrylic acid ester of alcohol having 1–8 carbon atoms and mixtures thereof, and (3) 0.3–10% by weight of a styrene derivative of the formula:

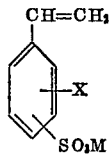

wherein X is H, OH, Cl or alkyl having 1–2 carbon atoms and M is H, Na, K or $NR_3R_4R_5R_6$ where $R_3$, $R_4$, $R_5$ and $R_6$ each represent H or alkyls having 1–4 carbon atoms, in a reaction medium consisting essentially of 85–65% by weight of dimethyl sulfoxide and 15–35% by weight of water.

4. The method of producing acrylic copolymers according to claim 1 which comprises polymerizing a monomer mixture consisting essentially of (1) 80–19.7% by weight of acrylonitrile, (2) 19.7% by weight of a vinyl monomer selected from the group consisting of styrene, vinyl acetate, vinyl ether, vinyl chloride, vinylidene chloride, methacrylonitrile, acrylic acid ester of alcohol having 1–8 carbon atoms, methacrylic acid ester of alcohol having 1–8 carbon atoms, and mixtures thereof, and (3) 0.3–10% by weight of a methallyl monomer of the formula:

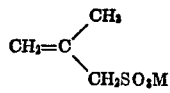

wherein M is H, Na, K, or $NR_3R_4R_5R_6$ where, $R_3$, $R_4$, $R_5$ and $R_6$ each represent H or an alkyl having 1–4 carbon atoms, in a reaction medium consisting essentially of 80–60% by weight of dimethyl sulfoxide and 20–40% by weight of water.

5. The method of producing fiber forming and flame retardant acrylic copolymers according to claim 1 which comprises polymerizing a monomer mixture consisting essentially of (1) 80–19.7% by weight of acrylonitrile, (2) 19.7–80% by weight of a monomer selected from the group consisting of vinyl chloride, vinylidene chloride, and mixtures htereof and (3) 0.3–10% by weight of hydrophilic vinyl monomer selected from the group consisting of:

(A) an acrylic monomer of the formula:

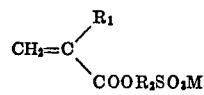

(B) a styrene derivative of the formula:

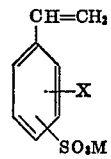

(C) a methallyl monomer of the formula:

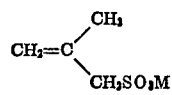

(D) a methacryl amide derivative of the formula:

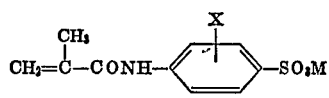

(E) a methallyl ether of the formula:

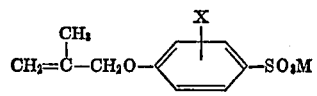

(F) and mixtures thereof;
wherein $R_1$ is H or $CH_3$, $R_2$ is a member selected from the group consisting of alkylene groups having 2–6 carbon atoms; cycloalkylene groups having 5–6 carbon atoms and phenylene; and M is H, Na, K or $NR_3R_4R_5R_6$ where $R_3$, $R_4$, $R_5$ and $R_6$ each represent H or an alkyl having 1–4 carbon atoms and X is H, OH, Cl, or an alkyl having 1–2 carbon atoms in a reaction medium consisting essentially of 80–60% by weight of dimethylsulfoxide and 20–40% by weight of water.

References Cited
UNITED STATES PATENTS

| | | | |
|---|---|---|---|
| 3,426,104 | 2/1969 | Masson | 260—895 |
| 3,310,535 | 3/1967 | Mazzolini et al. | 260—78.5 |
| 3,515,705 | 6/1970 | Balitrand | 260—85.5 |

LESTER L. LEE, Primary Examiner

U.S. Cl. X.R.

260—29.6 TA, 29.6 AN, 49, 80.5, 85.5 ES, 85.5 NC, 85.5 XA

UNITED STATES PATENT OFFICE
CERTIFICATE OF CORRECTION

Patent No. 3,781,248     Dated December 25, 1973

Inventor(s) Hiroshi Sakai et al

It is certified that error appears in the above-identified patent and that said Letters Patent are hereby corrected as shown below:

Column 3, line 31, delete "α-butyrolactone" and substitute --- γ-butyrolactone ---.

Column 4, lines 61-63, delete "o-hydroxy p-methacrylamide benzene sulfonic acid, m-methyl p-methacryl amide benzene sulfonic acid, o-chloro p-methacrylamide" and substitute ---2-hydroxy-4-methacrylamide benzene sulfonic acid, 3-methyl-4-methacryl amide benzene sulfonic acid, 2-chloro-4-methacrylamide---.

Column 6, line 16, delete "(α,α'-dimethylvaleronitrile)" and substitute ---(α,γ-dimethylvaleronitrile)---.

Column 6, line 22, after the words "acid gas" please insert ---may be used---.

Columns 7 and 8, Tables 1 and 2, Run number 7, delete "80   18" and substitute ---76   22---.

UNITED STATES PATENT OFFICE
CERTIFICATE OF CORRECTION

Patent No. 3,781,248  Dated December 25, 1973

Inventor(s) Hiroshi Sakai et al                               Page 2

It is certified that error appears in the above-identified patent and that said Letters Patent are hereby corrected as shown below:

Column 11, line 13, delete "35% of" and substitute ---55% of---.

Columns 11 and 12, Table 7, Run number 2, delete "(α-dimethylvaleronitrile)" and substitute ---(α,γ-dimethylvaleronitrile)---

Columns 11 and 12, Table 8, in the title delete "Adding amount of DMSO (9%)" and substitute ---Adding amount of DMSO parts---.

Column 13, Table 9, in the title delete "Spinnability (m./meter)" and substitute ---Spinnability (meters/min.)---.

Columns 13 and 14, Table 12, Run numbers 1 and 3, delete "12-Me-p-SSS," and substitute --2-Me-p-SSS,---.

Column 14, line 68, delete "sulfuric" and substitute ---sulfonic---.

Signed and sealed this 23rd day of July 1974.

(SEAL)
Attest:

McCOY M. GIBSON, JR.
Attesting Officer

C. MARSHALL DANN
Commissioner of Patents